US011326405B2

(12) United States Patent
Al-Mousa et al.

(10) Patent No.: US 11,326,405 B2
(45) Date of Patent: May 10, 2022

(54) SEPARATING SOLIDS FROM LIQUIDS IN A DRILLING FLUID

(71) Applicant: Saudi Arabian Oil Company, Dhahran (SA)

(72) Inventors: Ahmed Al-Mousa, Dhahran (SA); Marius Neacsu, Dhahran (SA); Omar M Alhamid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 125 days.

(21) Appl. No.: 16/879,273

(22) Filed: May 20, 2020

(65) Prior Publication Data

US 2021/0363839 A1 Nov. 25, 2021

(51) Int. Cl.
*E21B 21/06* (2006.01)
*B01D 21/28* (2006.01)
(Continued)

(52) U.S. Cl.
CPC .......... *E21B 21/065* (2013.01); *B01D 21/283* (2013.01); *B01D 29/0004* (2013.01); *B01D 29/0013* (2013.01); *B01D 29/01* (2013.01); *B01D 29/085* (2013.01); *B01D 33/17* (2013.01); *B07B 1/08* (2013.01); *C02F 1/004* (2013.01); *C02F 1/34* (2013.01); *C02F 2103/10* (2013.01)

(58) Field of Classification Search
CPC . E21B 21/065; B01D 21/283; B01D 29/0004; B01D 29/0013; B01D 29/01; B01D 29/085; B01D 33/17; B07B 1/08; C02F 1/004; C02F 1/34; C02F 2103/10
See application file for complete search history.

(56) References Cited

U.S. PATENT DOCUMENTS 1,979,500 A 11/1934 Sniffin
2,992,740 A * 7/1961 Phippen .................. B07B 1/343
209/316
(Continued)

FOREIGN PATENT DOCUMENTS

CN 105436067 3/2016

OTHER PUBLICATIONS

PCT International Search Report and Written Opinion in International Appln. No. PCT/US2021/032969, dated Sep. 13, 2021, 13 pages.

*Primary Examiner* — Liam Royce
(74) *Attorney, Agent, or Firm* — Fish & Richardson P.C.

(57) ABSTRACT

A drilling fluid shaker screen system includes a screen assembly that includes a screen including a plurality of screen sections. A first screen section includes a first screen mesh size and a second screen section includes a second screen mesh size different than the first screen mesh size. The drilling fluid shaker screen system further includes a rotation assembly mounted to the screen assembly. The rotation assembly includes one or more rollers moveable to rotate the screen assembly about an axis of rotation. The drilling fluid shaker screen system further includes a motor assembly coupled to the screen assembly and configured to vibrate the screen assembly. A housing includes a cuttings outlet that is fluidly coupled to a cuttings inlet formed in the screen and a liquid outlet separate from the cuttings outlet that is fluidly coupled to the plurality of screen sections.

29 Claims, 7 Drawing Sheets

(51) Int. Cl.
  *B01D 29/00* (2006.01)
  *B01D 29/01* (2006.01)
  *B01D 29/085* (2006.01)
  *B01D 33/17* (2006.01)
  *B07B 1/08* (2006.01)
  *C02F 1/00* (2006.01)
  *C02F 1/34* (2006.01)
  *C02F 103/10* (2006.01)

(56) References Cited

U.S. PATENT DOCUMENTS

| | | | |
|---|---|---|---|
| 3,504,793 A * | 4/1970 | More | B07B 1/08 |
| | | | 209/255 |
| 5,685,982 A | 11/1997 | Foster | |
| 6,155,428 A | 12/2000 | Bailey et al. | |
| 6,510,947 B1 | 1/2003 | Schulte et al. | |
| 6,811,032 B2 | 11/2004 | Schulte et al. | |
| 8,201,693 B2 | 6/2012 | Jan | |
| 8,596,463 B2 | 12/2013 | Burkhard | |
| 9,079,222 B2 | 7/2015 | Burnett et al. | |
| 2004/0074819 A1 | 4/2004 | Burnett | |
| 2005/0029015 A1 | 2/2005 | Burnett et al. | |
| 2006/0105896 A1 | 5/2006 | Smith et al. | |
| 2008/0078699 A1 | 4/2008 | Carr | |
| 2017/0074061 A1 | 3/2017 | Goldspink | |

\* cited by examiner

SEPARATING SOLIDS FROM LIQUIDS IN A DRILLING FLUID

TECHNICAL FIELD

This disclosure relates to separating solids from liquids in a drilling fluid.

BACKGROUND

In drilling and workover operations, drilling fluid (often called "drilling mud") is used to keep a hydrostatic pressure within a wellbore while drilling or while work over by circulating the drilling fluid into the wellbore. For example, the drilling fluid may be circulated through a tubular work string or drill pipe and through one or more nozzles formed in the drill bit and out into the wellbore. The drilling fluid helps with well control, as well as carries cuttings removed from a subterranean formation by the drill bit during drilling the wellbore back to the surface. These cuttings can be separated from the drilling fluid to maintain an initial set of properties (for example, viscosity, density, gel strength) of the drilling fluid.

SUMMARY

This disclosure describes implementations of a shaker screen system that may be used to separate formation cuttings from a liquid in a drilling fluid that has been used and recovered from a wellbore drilling or workover operation. In some aspects, the shaker screen system includes a screen assembly that includes multiple screen sections attached or coupled together (for example, within a circular screen). In some aspects, one or more of the multiple screen sections are formed of screens with varying mesh sizes, thereby allowing cuttings of different sizes to pass through the one or more screen sections.

In an example implementation, a drilling fluid shaker screen system includes a screen assembly that includes a screen mounted to a funnel, the screen including a plurality of screen sections. A first screen section of the plurality of screen sections includes a first screen mesh size and a second screen section of the plurality of screen sections includes a second screen mesh size different than the first screen mesh size. The first and second screen mesh sizes are based at least in part on a size of one or more cuttings entrained in a drilling fluid used in a drilling or workover operation. The drilling fluid shaker screen system further includes a rotation assembly mounted to the screen assembly. The rotation assembly includes one or more rollers moveable to rotate the screen assembly about an axis of rotation. The drilling fluid shaker screen system further includes a motor assembly coupled to the screen assembly and configured to vibrate the screen assembly; and a housing coupled to the screen assembly and the rotation assembly. The housing includes a cuttings outlet that is fluidly coupled to a cuttings inlet formed in the screen and a liquid outlet separate from the cuttings outlet that is fluidly coupled to the plurality of screen sections.

In an aspect combinable with the example implementation, the screen includes a circular screen area, and each of the plurality of screen sections includes a co-equal portion of the circular screen area.

In another aspect combinable with any of the previous aspects, the plurality of screen sections include four screen sections that include the first and second screen sections, each of the four screen sections including a quarter of the circular screen area.

In another aspect combinable with any of the previous aspects, the four screen sections further include a third screen section that includes a third screen mesh size and a fourth screen section that includes a fourth screen mesh size.

In another aspect combinable with any of the previous aspects, each of the first, second, third, and fourth screen mesh sizes is different.

In another aspect combinable with any of the previous aspects, the screen is mounted to the funnel at an angle that slopes downward from a perimeter of the screen toward the cuttings inlet.

In another aspect combinable with any of the previous aspects, the rotation assembly includes at least one rail mounted to at least one of the screen assembly or the rotation assembly and adjacent a perimeter of the screen assembly.

In another aspect combinable with any of the previous aspects, the rail is configured to receive at least a portion of the one or more rollers.

Another aspect combinable with any of the previous aspects further includes a vibration assembly mounted to the housing and including one or more springs configured to oscillate the screen assembly based at least in part on operation of the motor assembly.

In another aspect combinable with any of the previous aspects, the vibration assembly is mounted to a bottom portion of the rotation assembly, and the rotation assembly is mounted to a bottom portion of the funnel.

Another aspect combinable with any of the previous aspects further includes a locking assembly that includes a first member attached to the screen assembly; a second member attached to the rotation assembly; a bore formed through each of the first and second members; and a pin insertable through the bore to fixedly lock the screen assembly to the rotation assembly.

In another aspect combinable with any of the previous aspects, the first screen mesh size is configured to allow a first cutting to pass there through, and the second screen mesh size is configured to allow a second cutting larger than the first cutting to pass there through.

In another aspect combinable with any of the previous aspects, the cuttings inlet includes a hole in the screen centered at a center of the screen assembly.

In another aspect combinable with any of the previous aspects, the housing defines an interior volume fluidly coupled to the liquid outlet.

In another example implementation, a method for separating cuttings from liquid in a drilling fluid includes circulating a drilling fluid that includes a liquid and a plurality of formation cuttings to a screen assembly that includes a screen, the screen including a plurality of screen sections; vibrating the screen assembly during circulation of the drilling fluid to the screen assembly; while vibrating the screen assembly, separating, with the screen assembly, the liquid from the plurality of formation cuttings; while vibrating the screen assembly, separating a first portion of the plurality of formation cuttings of a first size from the drilling fluid with a first screen section that includes a first screen mesh size; rotating the screen assembly; subsequent to rotating the screen assembly and while vibrating the screen assembly, separating a second portion of the plurality of formation cuttings of a second size different than the first size from the drilling fluid with a second screen section that includes a second screen mesh size different than the first screen mesh size; directing the separated liquid through the screen assembly to a liquid outlet; and directing at least one of the first or second portions of the plurality of formation cuttings to a cuttings outlet formed in the screen.

In an aspect combinable with the example implementation, the screen includes a circular screen area, and each of the plurality of screen sections includes a co-equal portion of the circular screen area.

Another aspect combinable with any of the previous aspects further includes further rotating the screen assembly; while vibrating the screen assembly, separating a third portion of the plurality of formation cuttings of a third size different from the first and second sizes from the drilling fluid with a third screen section that includes a third screen mesh size different than the first and second screen mesh sizes; further rotating the screen assembly; and while vibrating the screen assembly, separating a fourth portion of the plurality of formation cuttings of a fourth size different from the first, second, and third sizes from the drilling fluid with a fourth screen section that includes a fourth screen mesh size different than the first, second, and third screen mesh sizes.

Another aspect combinable with any of the previous aspects further includes directing at least one of the third or fourth portions of the plurality of formation cuttings through the screen assembly with the separated liquid to the liquid outlet; and directing the other of the at least one of the third or fourth portions of the plurality of formation cuttings to the cuttings outlet formed in the screen.

Another aspect combinable with any of the previous aspects further includes directing the at least one of the first or second portions of the plurality of formation cuttings at a downward angle toward the cuttings inlet and away from a perimeter of the screen.

In another aspect combinable with any of the previous aspects, vibrating the screen assembly includes operating a motor to drive a gear or wheel coupled with the screen assembly; based on driving the gear or wheel, oscillating the screen assembly with a plurality of springs coupled to the screen assembly.

In another aspect combinable with any of the previous aspects, rotating the screen assembly includes moving at least one roller coupled with the screen assembly on a rail; and based on moving the at least one roller, rotating the screen assembly about an axis of rotation.

In another aspect combinable with any of the previous aspects, the first screen section that includes the first screen mesh size is positioned to receive the drilling fluid that includes the liquid and the plurality of formation cuttings during separating the first portion of the plurality of formation cuttings of the first size from the drilling fluid with the first screen section.

In another aspect combinable with any of the previous aspects, rotating the screen assembly includes rotating the screen assembly to position the second screen section that includes the second screen mesh size to receive the drilling fluid that includes the liquid and the plurality of formation cuttings.

Another aspect combinable with any of the previous aspects further includes prior to rotating the screen assembly, unlocking the screen assembly against rotation.

In another aspect combinable with any of the previous aspects, directing the at least one of the first or second portions of the plurality of formation cuttings to the cuttings outlet formed in the screen includes directing the at least one of the first or second portions of the plurality of formation cuttings to the cuttings outlet that is centered at a center of the screen assembly.

Another aspect combinable with any of the previous aspects further includes directing at least a portion of the separated liquid through the screen assembly through the liquid outlet and to an enclosed portion of a housing that is coupled to the screen assembly.

Implementations of a shaker screen system according to the present disclosure may include one or more of the following features. For example, the shaker screen system may provide for multiple, different screens that each have a different screen mesh size in a single assembly. As another example, the shaker screen system may more efficiently remove unwanted fine particles as compared to conventional shaker screens, which can save cost and rig time during a drilling or workover operation. As another example, the shaker screen system may allow for switching from one screen mesh size to another without the conventional requirement of stopping operations to remove and install screens of different mesh size in the shaker screen system. As yet another example, the shaker screen system may require less time (for example, by an operator) to change to a desired screen mesh size.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes a shaker screen system that may be used to separate formation cuttings from a liquid of a drilling fluid that is recovered to a terranean surface from a wellbore in a drilling or workover operation. In some aspects, the shaker screen system includes a rotating screen, which allows multiple size mesh to be installed in one screen to remove different size cuttings from a flow of the drilling fluid. Thus, in some aspects, the example implementations of the shaker screen system may scale efficiently and be used to separate cuttings from liquid in many different types of drilling fluid (for example, according to viscosity, density, or otherwise) as well as many different types of subterranean formations (for example, shale, sandstone, or otherwise).

Figure 1:
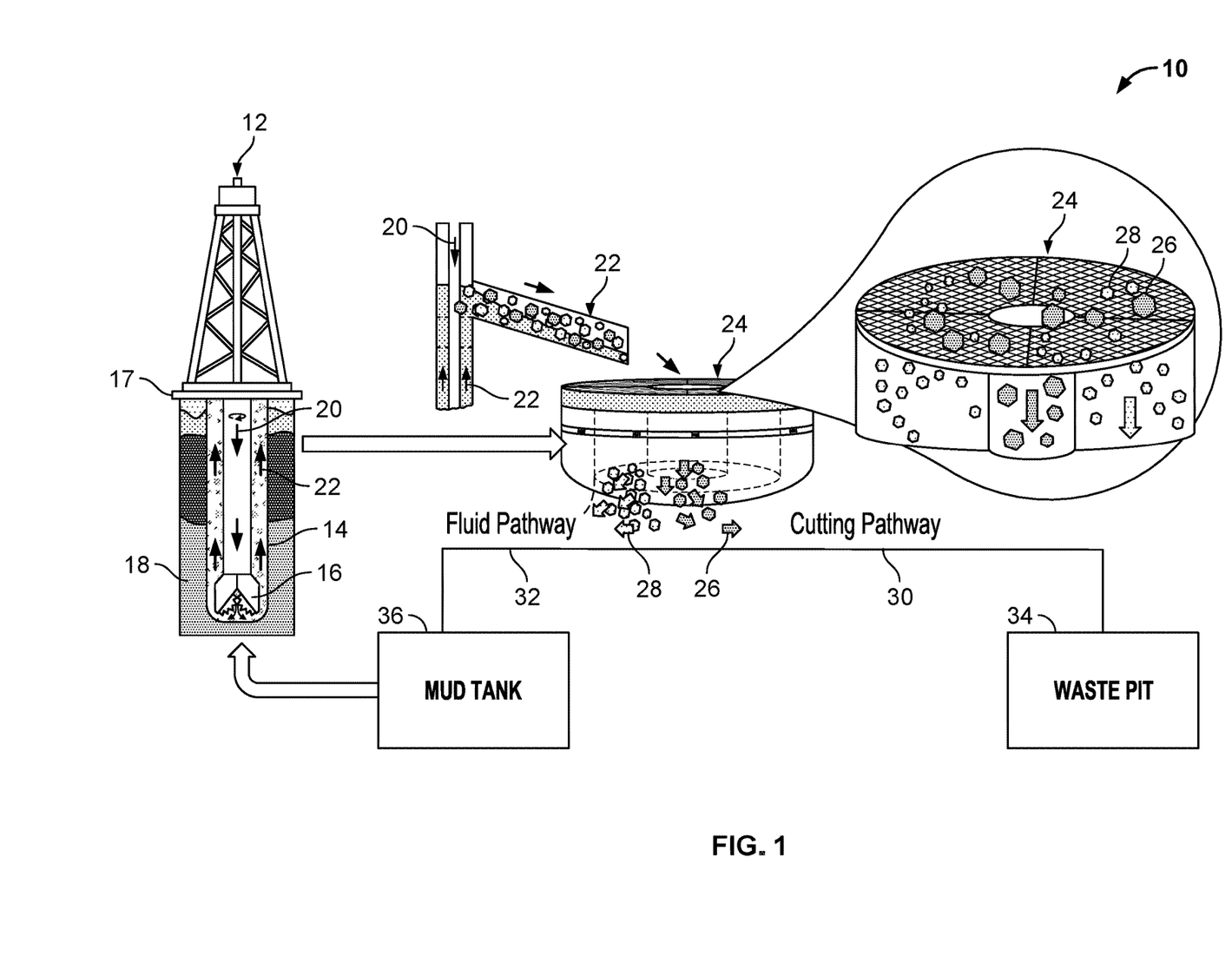
FIG. 1 is a schematic diagram of wellbore drilling or workover process that includes a shaker screen system according to the present disclosure.

FIG. 1 is a schematic diagram of wellbore drilling or workover process 10 ("drilling process 10") that includes a shaker screen system 24 according to the present disclosure. Generally, the drilling process 10 represents a process in which a wellbore 14 is formed from a terranean surface 17 and through one or more subterranean formations 18 by a drilling rig 12. The drilling process 10, in this example, includes a drill bit 16 coupled to a downhole conveyance (for example, a tubular drill string, such as conventional or coiled tubing) that forms the wellbore 14 with a drilling fluid 20. The drilling fluid 20 is provided to the drill bit 16 by, for example, the downhole conveyance, and circulates through the drill bit 16 during drilling of the wellbore 14 in order to, for example, cool the drill bit 16 and removing cuttings from the subterranean formation 18 back to the surface 17. Thus, return drilling fluid 22 includes the drilling fluid 20 (for example, a water or foam and chemical mixture) as well as cuttings (for example, bits of rock cut from the formation 18 by the drill bit 16). Return drilling fluid 22, therefore, includes liquid 28 and cuttings 26 from the formation 18, which may be removed.

As shown in FIG. 1, the return drilling fluid 22 is circulated out of the wellbore 14 to the shaker screen system 24. As described in more detail in this disclosure, the shaker screen system 24 separates the liquid 28 from the cuttings 26 of the return drilling fluid 22 with a screen that includes multiple screen sections. At least one of the screen sections has a particular screen mesh size (for example, a size of the holes in the screen section) that is different than another particular screen mesh size of another screen section of the screen. Thus, different sized cuttings 26 may be filtered by the shaker screen system 24. Some cuttings 26 may be small enough to remain entrained in the liquid 28. Other cuttings 26 may be large enough to be separated from the liquid 28 by the shaker screen system 24.

As shown in the example implementation of FIG. 1, the liquid 28 (which may include some cuttings 26 of a size small enough to remain entrained in the liquid 28 through the shaker screen system 24) and the cuttings 26 are separated into two separate streams. The liquid 28 is circulated from the shaker screen system 24 in a fluid pathway 32 and into a mud tank 36. Generally, the mud tank 36 is used to hold the separated liquid 28 and provide the separated liquid 28 as a source of liquid for additional drilling fluid 20 (in other words, to recycle back into the drilling process 10 as drilling fluid 20). The cuttings 26 are circulated into a cuttings pathway 30 and into one or more waste pits 34. Generally, the waste pits 34 are pits or other enclosures that store the cuttings 26 for proper disposal.

Figure 2:
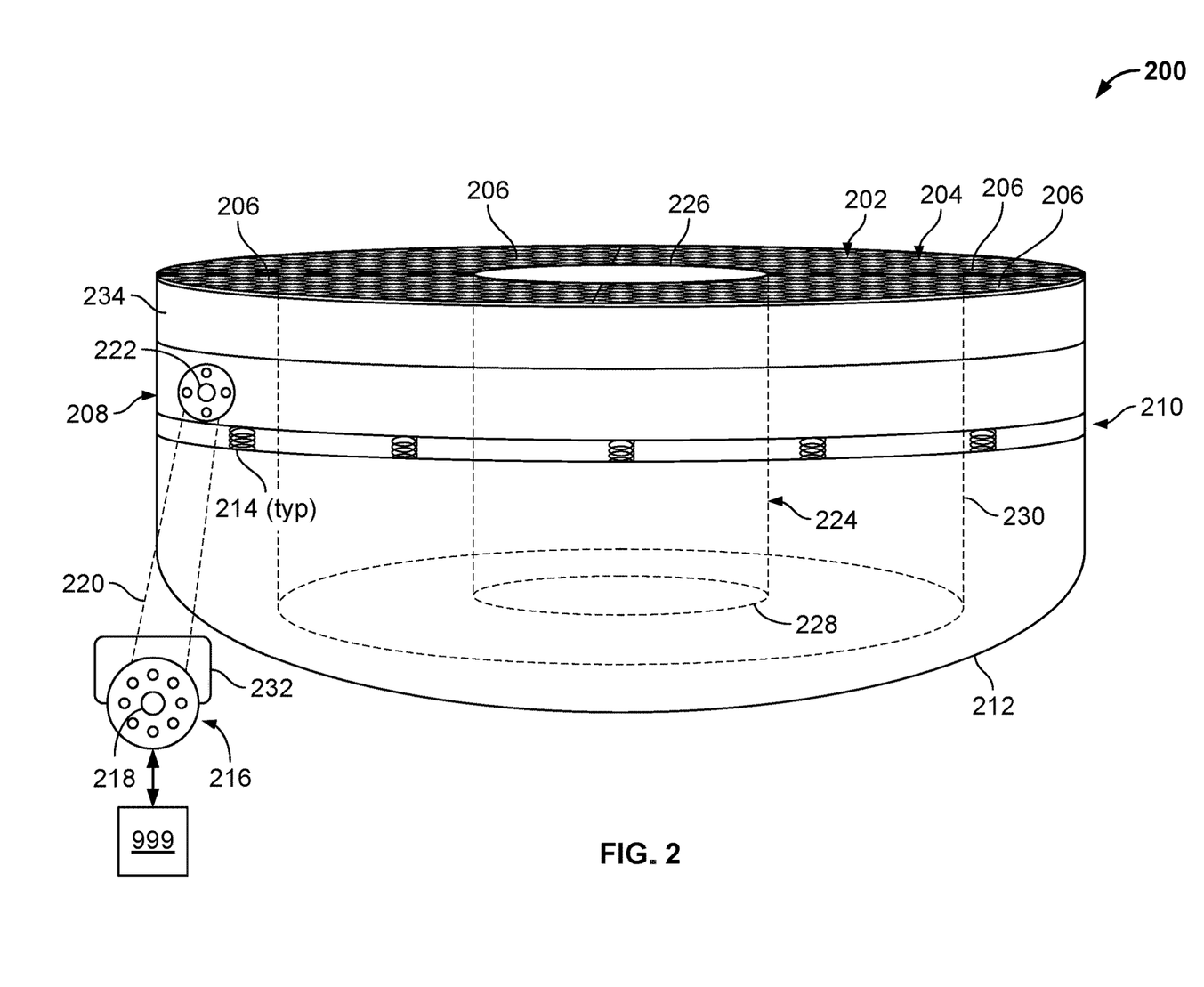
FIG. 2 is a schematic diagram of an example implementation of a shaker screen system according to the present disclosure.
Figure 3:
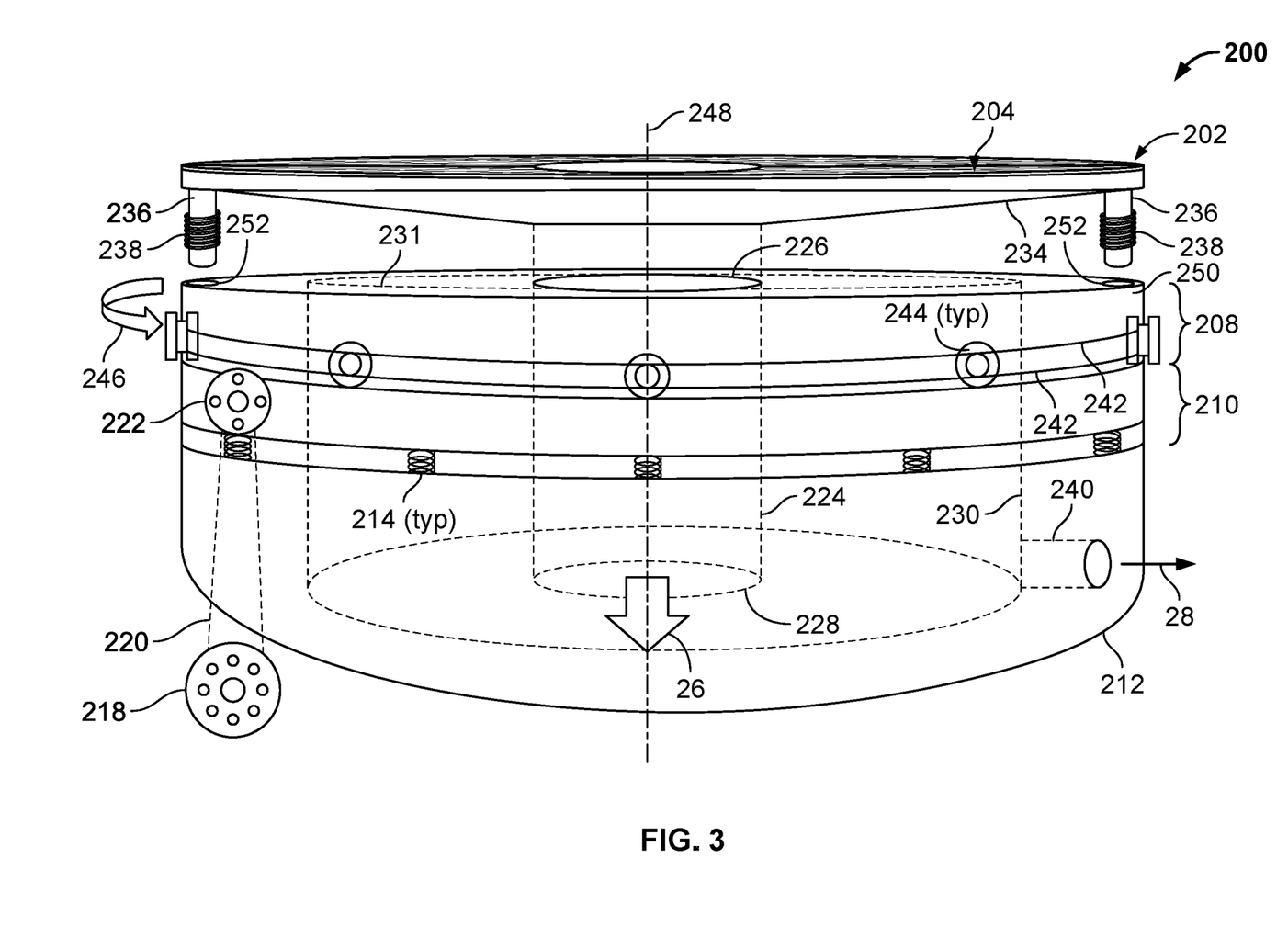
FIG. 3 is an exploded view of an example implementation of a shaker screen system according to the present disclosure.

FIG. 2 is a schematic diagram of an example implementation of a shaker screen system 200 according to the present disclosure. The shaker screen system 200, in this example, may be used as the shaker screen system 24 shown in the drilling process 10 in FIG. 1. FIG. 3 is an exploded view of the example implementation of the shaker screen system 200. As shown in this implementation, the shaker screen system 200 includes a housing 212 that forms a partial enclosure with an open top. A screen assembly 202 is mounted to the open top of the housing 212 by legs 236 that insert into holes 252. The screen assembly 202, in this example, includes a screen 204 (for example, circular) that is comprised of multiple screen sections 206. In this example, there are four screen sections 206 that combine to form the screen 204 in equal portions (here, quarter portions). Other implementations may include more or fewer screen sections 206.

Each of the multiple screen sections 206 may have a screen mesh size that is different than a screen mesh size of the other screen sections 206. For example, as shown in FIGS. 2-3, each of the four screen sections 206 may have a screen mesh size different than the screen mesh size of the other screen sections 206. Thus, as the screen 204 rotates during operation of the shaker screen system 200, a particular screen section 206 of a particular screen mesh size will remove specific cuttings 26 of a specific particle size, and as the screen 204 continues to rotate, the next screen section 206 of a different screen mesh size will remove, for example, even finer particles of cuttings 26. During a full rotation of the screen 204 (for example, 360° about the axis 248), the return drilling fluid 22 may be restored to the same or similar properties (for example, viscosity, density) as the drilling fluid 20.

In this example, there are four different screen mesh sizes, which allow for four differently-sized cuttings from a return drilling fluid to be separated from the liquid in the return drilling fluid. In other examples, two of the four screen sections 206 may have a particular screen mesh size and two of the four screen sections 206 may have another particular screen mesh size. In other examples, one of the four screen sections 206 may have a particular screen mesh size and three of the four screen sections 206 may have another particular screen mesh size. Other examples of different combinations of screen sections 206 and screen mesh sizes are also contemplated by the present disclosure.

Figure 6:
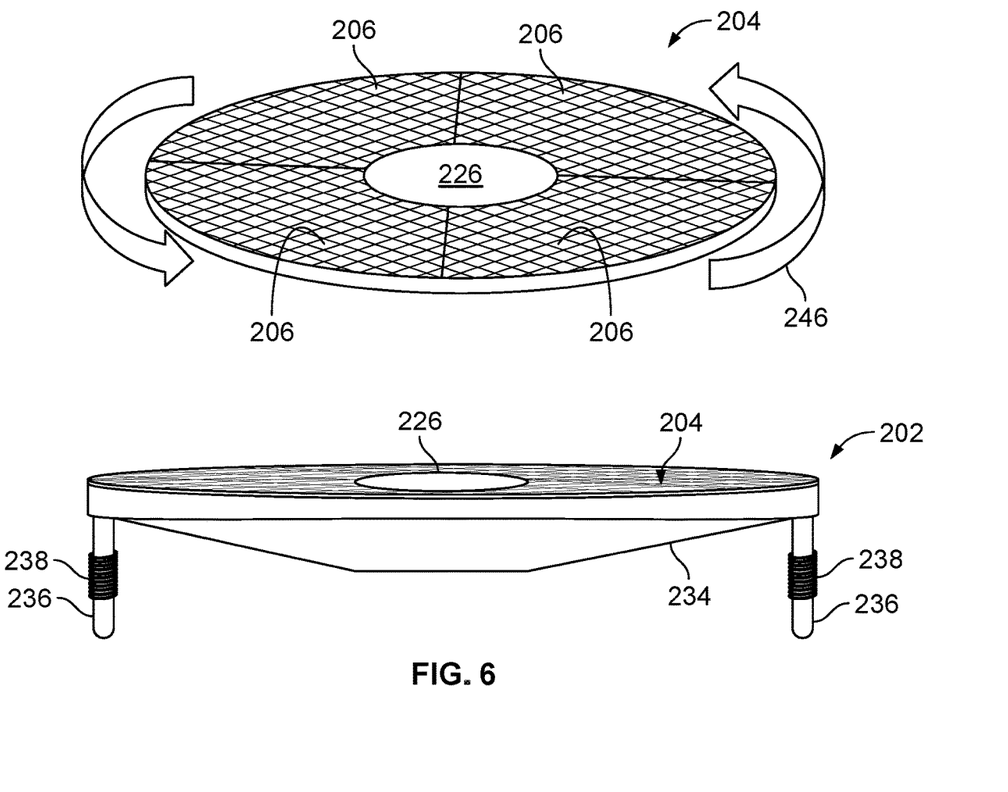

Turning briefly to FIG. 6, the screen 204 is positioned at a top of a funnel 234 that includes the legs 236 that can be inserted into a rotation assembly 208 that is mounted to the housing 212 below the screen assembly 202. The funnel 234 and screen 204 include a cuttings inlet 226 formed with a center that coincides with a centerline axis 248 of the shaker screen system 200. Springs 238 are positioned about the legs 236 in order for the screen assembly 202 to "float" on the rotation assembly 208.

Figure 8:
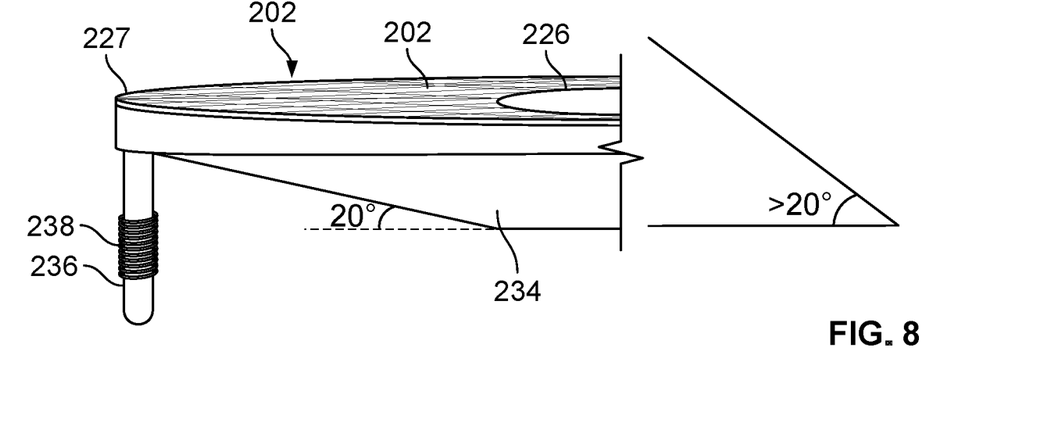
FIG. 8 is a partial schematic illustrations of a screen assembly of an example implementation of a shaker screen system according to the present disclosure.

Turning briefly to FIG. 8, this figure shows a detail of the screen assembly 202. In this example implementation, the funnel 234 may be angled (for example, downward) at a particular angle. In this example, the angle is at or about 20°, but other angles are contemplated by the present disclosure. The screen 204 may also be angled from a perimeter 227 of the screen 204 toward the cuttings inlet 226. In this example the screen 204 may also be angled downward at or about 20°.

Figure 5:
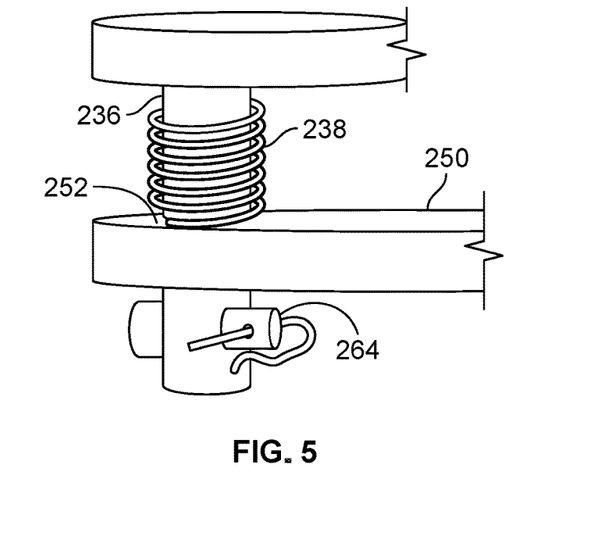
FIGS. 5-6 are schematic illustrations of one or more details of a screen assembly of an example implementation of a shaker screen system according to the present disclosure.

Turning briefly to FIG. 5, a detail of the connection between the screen assembly 202 and the rotation assembly 208 is shown. As illustrated in this figure, the leg 236 is inserted into the hole 252 of an upper plate 250 of the rotation assembly 208. The spring 238 buffets contact between the screen assembly 202 and the rotation assembly 209. Once the leg 236 is positioned through the hole 252, a cotter pin 264 may be positioned to secure the screen assembly 202 to the rotation assembly 209, as shown.

Turning back to FIGS. 2 and 3, the rotation assembly 208 operates to provide rotation 246 to the screen assembly 202, for example during operation of the shaker screen system 200 or between operation times of the shaker screen system 200. In this example, the rotation assembly 208 includes one or more rails 242 (in this example, two, an upper rail 242 and a lower rail 242) that circumscribe an inside perimeter of the rotation assembly 208. One or more rollers 244 are mounted to the rails 242 and are moved (for example, rotated) to rotate the rotation assembly 208 and the screen assembly 202.

Figure 4A:
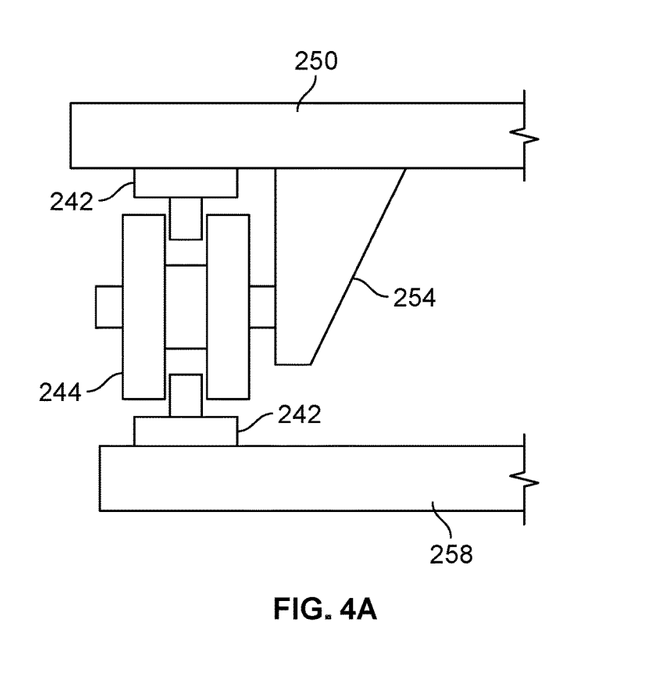
FIGS. 4A-4B are schematic illustrations of components of an example implementation of a shaker screen system according to the present disclosure.
Figure 4B:
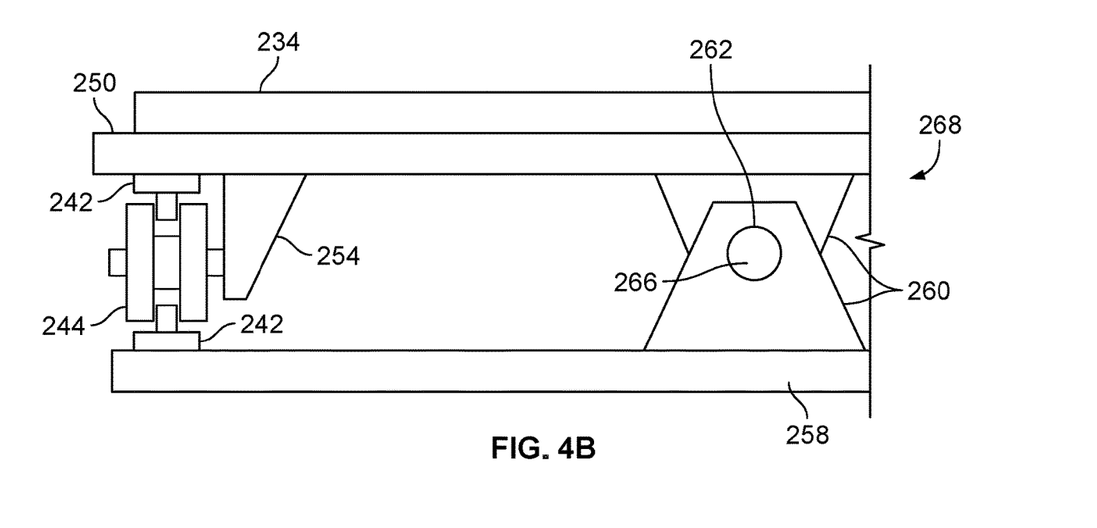

Turning briefly to FIGS. 4A-4B, these figures illustrate portions of the rotation assembly 208. For example, as shown, in this example, the rails 242 are attached to the upper plate 250 and a lower plate 258 of the rotation assembly 208. The rails 242 are aligned along the perimeters of the lower and upper plates 258 and 250, respectively. A roller 244 is connected, in this example, to the upper plate 250 through a leg 254 to receive and ride on the rails 242 as shown. In operation, the rotation assembly 208 may be rotated in order to rotate the shaker screen assembly 202 into a position such that a particular screen section 206 (with a particular screen mesh size) is positioned to receive the return drilling fluid 22. As described with reference to FIG. 7, for instance, once positioned appropriately, the shaker screen assembly 202 may be locked or otherwise held in place. If a different screen section 206 (with different screen mesh size) is desired, the shaker screen assembly 202 may be unlocked and rotated (on the rotation assembly 208) so that a different screen section 206 is positioned to receive the return drilling fluid 22.

The example implementation of the shaker screen system 200 includes a vibration assembly 210 mounted to or in the housing 212 below a rotation assembly 208. As shown in this example, the vibration assembly 210 include multiple springs 214 that facilitate oscillation of the rotation assembly 208 (for example, vertical oscillation), which in turn is translated to the screen assembly 202 during operation of the shaker screen system 200. In this example implementation, a motor assembly 216 may be operated (for example, by the controller 999) to provide vibratory movement to initiate (and also, maintain, in some aspects) oscillation of the rotation assembly 208 (for example, vertical oscillation), which in turn is translated to the screen assembly 202 during operation of the shaker screen system 200.

As shown, the motor assembly 216 includes an electric motor 232 coupled to a motor gear 218, that in turn is coupled to a drive gear 222 through a belt or chain 220. A control system (or controller) 999 is communicably coupled to the motor assembly 216 to control operations of the motor assembly 216. In example implementations, the controller 999 may be a microprocessor-based, electro-mechanical, pneumatic, or hydraulic controller that may control the motor assembly 216 based on operator input and/or based on a sensed operation of the motor assembly 216, and more generally, the shaker screen system 200.

As shown in the example implementation of the shaker screen system 200, a cuttings pathway 224 extends vertically through the shaker screen system 200, with the cuttings inlet 226 forming an inlet to the pathway 224 and the pathway 224 having a cuttings outlet 228 formed opposite the cuttings inlet 226. As explained in more detail later, cuttings 26 from the return drilling fluid 22 that are not small enough to be entrained with the liquid 28 are separated from the return drilling fluid 22 and move (for example, through vibration) to the cuttings inlet 226 and then through the cuttings pathway 224 for removal from the outlet 228 (for example, to one or more mud pits). In some examples, the cuttings pathway 224 is formed of a tubular that extends between the cuttings inlet 226 and the cuttings outlet 228. Thus, once in the pathway 224, cuttings 26 may not escape into a liquid pathway 230 of the housing 212.

As further shown in this example, the liquid pathway 230 extends vertically through the shaker screen system 200 in an annulus between the cuttings pathway 224 and the housing 212. The liquid pathway 230 includes an inlet 231 located under the screen 204 in order to receive the separated liquid 28 from the return drilling fluid 22. In this example, the liquid pathway 230 include an outlet 240 to direct the liquid 28 to, for example, one or more mud tanks 36. As explained in more detail later, liquid 28 (and small cuttings 26 entrained in the liquid 28) from the return drilling fluid 22 is separated from the return drilling fluid 22 and falls through the screen 204 into the liquid pathway 230. In some examples, the liquid pathway 230 is formed of a tubular that extends between the inlet 231 and a bottom of the housing 212. Thus, once in the pathway 230, liquid 28 may not escape into an inner volume of the housing 212 or into the cuttings pathway 224.

Figure 7:
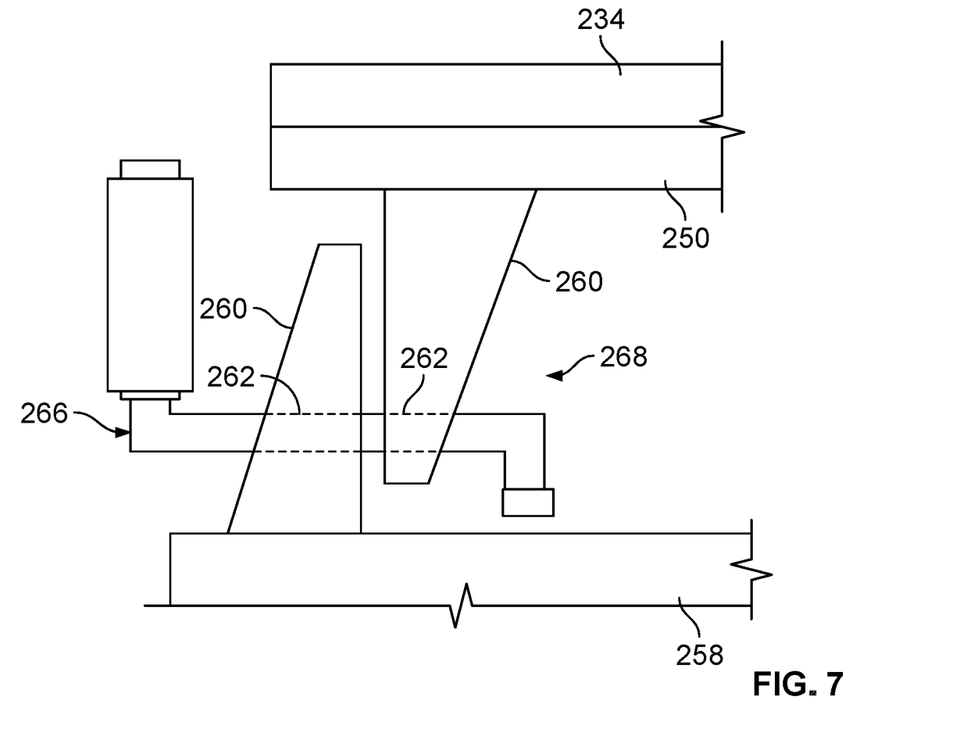
FIG. 7 is a schematic illustration of a locking assembly of an example implementation of a shaker screen system according to the present disclosure.

Turning to FIGS. 4B and 7, these figures illustrate an example implementation of a locking assembly 268 of the shaker screen system 200. For example, during non-operation of the shaker screen system 200 or, for example, to lock a particular screen section 206 (with a desired screen mesh size) at a desired location, the rotation assembly 208 may be locked against rotational movement, thereby also locking the screen assembly 202 against rotational movement. As shown in this example, the locking assembly 268 includes a plate 260 attached to the upper plate 250 and a plate 260 attached to the lower plate 258. Each of the plates 260 includes a bore 262 there through. When the plates 260 are aligned, the bores 262 of the plates 260 are aligned to accept a locking pin 266 through the bores 262. The locking pin 266, once inserted through both bores 262, locks the upper and lower plates 250 and 258 against rotational movement, thereby preventing rotational movement of the rotation assembly 208.

Figure 9:
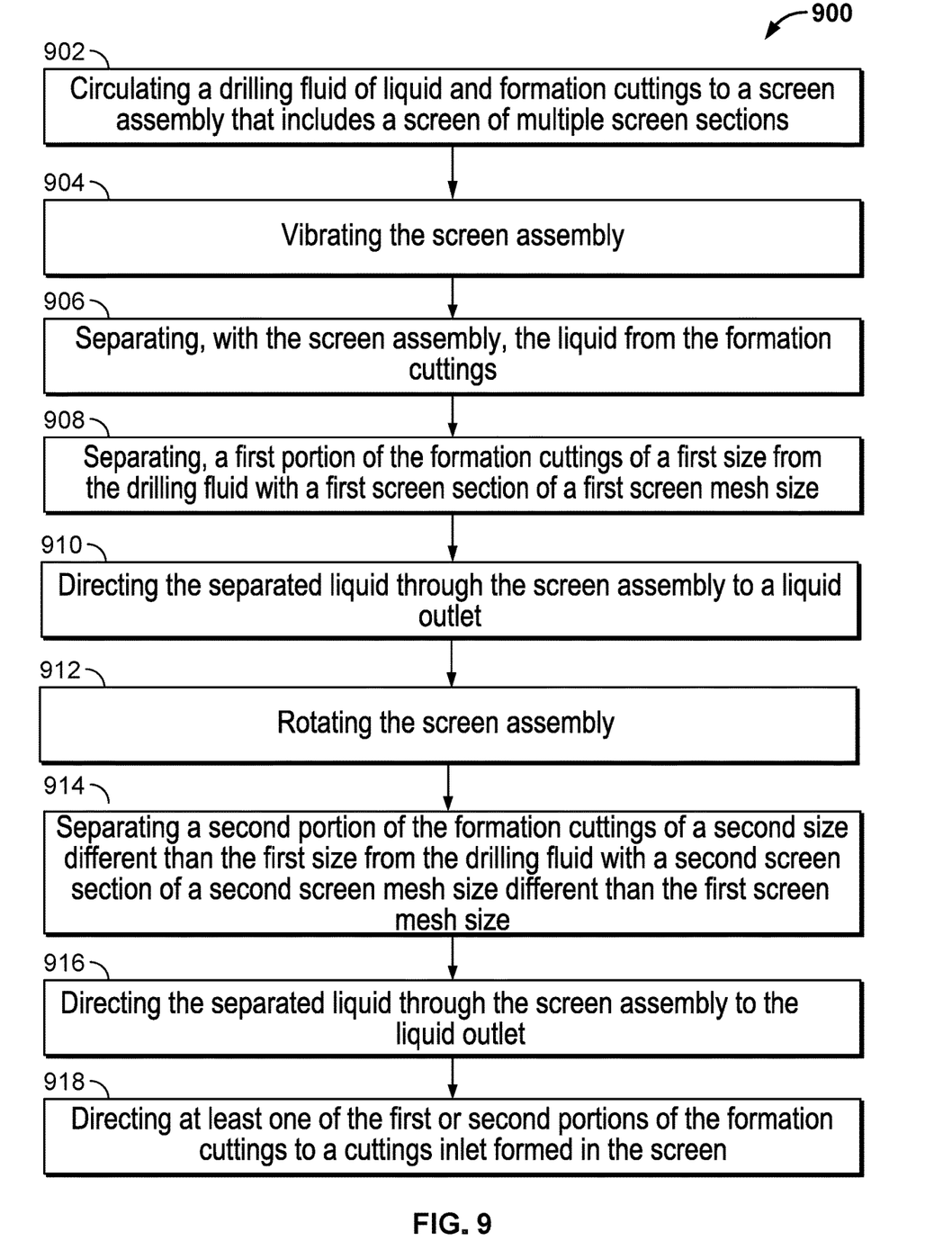
FIG. 9 is a flowchart that describes an example method for separating formation cuttings from a liquid in a drilling fluid according to the present disclosure.

FIG. 9 is a flowchart that describes an example method 900 for separating formation cuttings 26 from a liquid 28 in a return drilling fluid 22. The example method 900 is described with reference to the shaker screen system 200 shown in the figures. Method 900 may begin at step 902, which includes circulating a drilling fluid of liquid and formation cuttings to a screen assembly that includes a screen of multiple screen sections. For example, return drilling fluid 22 may be circulated to the screen assembly 202 of the shaker screen system 200 shown in the figures. The return drilling fluid 22 is comprised of liquid 28 and cuttings 26. As shown in FIGS. 2-3, the screen assembly 202 includes multiple screen sections 206 of the screen 204. In some aspects, the screen sections 206 have differing screen mesh sizes to allow for different sizes of the particles in the cuttings 26 to fall through the mesh.

Method 900 may continue at step 904, which includes vibrating the screen assembly during circulation of the drilling fluid to the screen assembly. For example, as shown in FIGS. 2-3, the motor assembly 216 (for example, with electric motor 232 or other prime mover) may be started (and controlled by the controller 999) to vibrate the shaker assembly 200. The motor 232 drives the motor gear 218, which in turn drives the gear 222 through belt or chain 220. As the gear 222 rotates, the shaker screen assembly 202 vibrates. For example, oscillation of the rotation assembly 208 (and likewise the screen assembly 202) may occur based on the operation of the motor assembly 216 to initiate vibration and also the springs 214 mounted below the rotation assembly 208. In some aspects, initial operation of the motor assembly 216 may be sufficient to begin (and maintain) oscillation of the assemblies 208 and 202 by the springs 214. In some aspects, continual operation of the motor assembly 216 may be needed to begin (and maintain)

oscillation of the assemblies 208 and 202 by the springs 214. In some aspects, the oscillation may be eccentric.

Method 900 may continue at step 906, which includes which includes separating, with the screen assembly, the liquid from the formation cuttings. For example, as the return drilling fluid 22 is circulated to the screen 204, the liquid 28 may be separated by failing through the screen sections 206. The separated liquid 28 falls into the liquid pathway 230 and exits the housing 212 of the shaker screen system 200 at the outlet 240 (for example, to the mud tank 36). In some aspects, a portion of the cuttings 26 may also be entrained in the liquid 28 and fall through the screen sections 206 into the liquid pathway 230. For example, one or more particular screen sections 206 may be selected based on or include a screen mesh size that allows certain size particles to stay entrained with the liquid 28. As the screen assembly 202 rotates and the particular screen sections 206 receive the circulated return drilling fluid 22, such smaller particles may pass through these screen sections 206.

Method 900 may continue at step 908, which includes separating a first portion of the formation cuttings of a first size from the drilling fluid with a first screen section of a first screen mesh size. For example, particles larger than those entrained with the liquid 28 may remain in the return drilling fluid 22 on the screen 204 until such particles are moved (for example, by vibration) to a first screen section 206 with a mesh size that allows the particles of the cuttings 26 to fall there through (to the cuttings pathway 224). Other, larger particles of the cuttings 26 may remain on the screen 204 as they do not fall through the first screen section 206.

Method 900 may continue at step 910, which includes directing the separated liquid through the screen assembly to a liquid outlet. For example, the separated liquid 28 falls into the liquid pathway 230 and exits the housing 212 of the shaker screen system 200 at the outlet 240 (for example, to the mud tank 36). In some aspects, of course, steps 908 and 910 may be performed simultaneously or substantially simultaneously.

Method 900 may continue at step 912, which includes rotating the screen assembly. For example, in some aspects, the first screen section of the first screen mesh size may be desired to separate the formation cuttings of the first size from the liquid. But as the return drilling fluid may change consistency (for example, with different sized formation cuttings due to, for instance, a different rock formation). Thus, in some aspects, another screen mesh size (in a second screen section) may be desired at some point during method 200. In some aspects, rotating the screen assembly includes unlocking the rotation assembly 208 to allow rotation of the rotation assembly 208, and thus the shaker screen assembly 202, to move the desired shaker screen section 206 to receive the return drilling fluid 22. Once rotated, the shaker screen assembly 202 may be re-locked into position, for instance, by re-locking the rotation assembly 208.

Method 900 may continue at step 914, which includes separating a second portion of the formation cuttings of a second size different than the first size from the drilling fluid with a second screen section of a second screen mesh size that is different than the first screen mesh size. For example, the larger particles that do not fall through the first screen section 206 of step 908 may nonetheless be moved (for example, through vibration) to a second screen section 206 with a larger mesh size (in other words, larger holes in the screen section) relative to the first screen section 206 of step 908. Once the larger particles of the cuttings 26 are moved to the second screen section 206, such particles may then fall through the second screen section 206 to the cuttings pathway 224. In additional aspects of method 900, steps 912 and 914 may be repeated for each different screen mesh size of the different screen sections 206 of the screen 204.

Method 900 may continue at step 916, which includes directing the separated liquid through the screen assembly (the second screen section) to the liquid outlet. For example, the separated liquid 28 falls into the liquid pathway 230 and exits the housing 212 of the shaker screen system 200 at the outlet 240 (for example, to the mud tank 36). In some aspects, of course, steps 914 and 916 may be performed simultaneously or substantially simultaneously.

Method 900 may continue at step 918, which includes directing at least one of the first or second portions of the formation cuttings to a cuttings inlet formed in the screen. For example, once the particles of the cuttings 26 fall through one of the first or second screen sections 206, such particles may then enter the cuttings pathway 224 and exit the housing 212 to the waste pits 34.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A drilling fluid shaker screen system, comprising:
 a screen assembly that comprises a screen mounted to a funnel, the screen comprising a plurality of screen sections, where a first screen section of the plurality of screen sections comprises a first screen mesh size and a second screen section of the plurality of screen sections comprises a second screen mesh size different than the first screen mesh size, the first and second screen mesh sizes each configured to allow one or more cuttings entrained in a drilling fluid used in a drilling or workover operation to pass therethrough;
 a rotation assembly mounted to the screen assembly, the rotation assembly comprising one or more rollers moveable to rotate the screen assembly about an axis of rotation, the rotation assembly comprising at least one rail mounted to at least one of the screen assembly or the rotation assembly and adjacent a perimeter of the screen assembly, the rail configured to receive at least a portion of the one or more rollers;
 a motor assembly coupled to the screen assembly and configured to vibrate the screen assembly; and
 a housing coupled to the screen assembly and the rotation assembly, the housing comprising a cuttings outlet that is fluidly coupled to a cuttings inlet formed in the screen, and a liquid outlet separate from the cuttings outlet that is fluidly coupled to the plurality of screen sections.

2. The drilling fluid shaker screen system of claim 1, wherein the screen comprises a circular screen area, and each of the plurality of screen sections comprises a co-equal portion of the circular screen area.

3. The drilling fluid shaker screen system of claim 2, wherein the plurality of screen sections comprise four screen sections that include the first and second screen sections, each of the four screen sections comprising a quarter of the circular screen area.

4. The drilling fluid shaker screen system of claim 3, wherein the four screen sections further comprise a third screen section that comprises a third screen mesh size and a fourth screen section that comprises a fourth screen mesh size, and each of the first, second, third, and fourth screen mesh sizes is different.

5. The drilling fluid shaker screen system of claim 1, wherein the screen is mounted to the funnel at an angle that slopes downward from a perimeter of the screen toward the cuttings inlet.

6. The drilling fluid shaker screen system of claim 1, further comprising a vibration assembly mounted to the housing and comprising one or more springs configured to oscillate the screen assembly based at least in part on operation of the motor assembly.

7. The drilling fluid shaker screen system of claim 6, wherein the vibration assembly is mounted to a bottom portion of the rotation assembly, and the rotation assembly is mounted to a bottom portion of the funnel.

8. The drilling fluid shaker screen system of claim 1, further comprising a locking assembly that comprises:
- a first member attached to the screen assembly;
- a second member attached to the rotation assembly;
- a bore formed through each of the first and second members; and
- a pin insertable through the bore to fixedly lock the screen assembly to the rotation assembly.

9. The drilling fluid shaker screen system of claim 1, wherein the first screen mesh size is configured to allow a first cutting to pass there through, and the second screen mesh size is configured to allow a second cutting larger than the first cutting to pass there through.

10. The drilling fluid shaker screen system of claim 1, wherein the cuttings inlet comprises a hole in the screen centered at a center of the screen assembly.

11. The drilling fluid shaker screen system of claim 1, wherein the housing defines an interior volume fluidly coupled to the liquid outlet.

12. A drilling fluid shaker screen system, comprising:
- a screen assembly that comprises a screen mounted to a funnel, the screen comprising a plurality of screen sections, where a first screen section of the plurality of screen sections comprises a first screen mesh size and a second screen section of the plurality of screen sections comprises a second screen mesh size different than the first screen mesh size, the first and second screen mesh sizes each configured to allow one or more cuttings entrained in a drilling fluid used in a drilling or workover operation to pass therethrough;
- a rotation assembly mounted to the screen assembly, the rotation assembly comprising one or more rollers moveable to rotate the screen assembly about an axis of rotation;
- a motor assembly coupled to the screen assembly and configured to vibrate the screen assembly;
- a vibration assembly mounted to the housing and comprising one or more springs configured to oscillate the screen assembly based at least in part on operation of the motor assembly, the vibration assembly mounted to a bottom portion of the rotation assembly, and the rotation assembly is mounted to a bottom portion of the funnel; and
- a housing coupled to the screen assembly and the rotation assembly, the housing comprising a cuttings outlet that is fluidly coupled to a cuttings inlet formed in the screen, and a liquid outlet separate from the cuttings outlet that is fluidly coupled to the plurality of screen sections.

13. The drilling fluid shaker screen system of claim 12, wherein the screen comprises a circular screen area, and each of the plurality of screen sections comprises a co-equal portion of the circular screen area.

14. The drilling fluid shaker screen system of claim 13, wherein the plurality of screen sections comprise four screen sections that include the first and second screen sections, each of the four screen sections comprising a quarter of the circular screen area.

15. The drilling fluid shaker screen system of claim 14, wherein the four screen sections further comprise a third screen section that comprises a third screen mesh size and a fourth screen section that comprises a fourth screen mesh size, and each of the first, second, third, and fourth screen mesh sizes is different.

16. The drilling fluid shaker screen system of claim 12, wherein the screen is mounted to the funnel at an angle that slopes downward from a perimeter of the screen toward the cuttings inlet.

17. The drilling fluid shaker screen system of claim 12, further comprising a locking assembly that comprises:
- a first member attached to the screen assembly;
- a second member attached to the rotation assembly;
- a bore formed through each of the first and second members; and
- a pin insertable through the bore to fixedly lock the screen assembly to the rotation assembly.

18. The drilling fluid shaker screen system of claim 12, wherein the first screen mesh size is configured to allow a first cutting to pass there through, and the second screen mesh size is configured to allow a second cutting larger than the first cutting to pass there through.

19. The drilling fluid shaker screen system of claim 12, wherein the cuttings inlet comprises a hole in the screen centered at a center of the screen assembly.

20. The drilling fluid shaker screen system of claim 12, wherein the housing defines an interior volume fluidly coupled to the liquid outlet.

21. A drilling fluid shaker screen system, comprising:
- a screen assembly that comprises a screen mounted to a funnel, the screen comprising a plurality of screen sections, where a first screen section of the plurality of screen sections comprises a first screen mesh size and a second screen section of the plurality of screen sections comprises a second screen mesh size different than the first screen mesh size, the first and second screen mesh sizes each configured to allow one or more cuttings entrained in a drilling fluid used in a drilling or workover operation to pass therethrough;
- a rotation assembly mounted to the screen assembly, the rotation assembly comprising one or more rollers moveable to rotate the screen assembly about an axis of rotation;
- a motor assembly coupled to the screen assembly and configured to vibrate the screen assembly;
- a locking assembly that comprises:
  - a first member attached to the screen assembly;
  - a second member attached to the rotation assembly;
  - a bore formed through each of the first and second members; and
  - a pin insertable through the bore to fixedly lock the screen assembly to the rotation assembly; and
- a housing coupled to the screen assembly and the rotation assembly, the housing comprising a cuttings outlet that is fluidly coupled to a cuttings inlet formed in the screen, and a liquid outlet separate from the cuttings outlet that is fluidly coupled to the plurality of screen sections.

22. The drilling fluid shaker screen system of claim 21, wherein the screen comprises a circular screen area, and each of the plurality of screen sections comprises a co-equal portion of the circular screen area.

23. The drilling fluid shaker screen system of claim 22, wherein the plurality of screen sections comprise four screen sections that include the first and second screen sections, each of the four screen sections comprising a quarter of the circular screen area.

24. The drilling fluid shaker screen system of claim 23, wherein the four screen sections further comprise a third screen section that comprises a third screen mesh size and a fourth screen section that comprises a fourth screen mesh size, and each of the first, second, third, and fourth screen mesh sizes is different.

25. The drilling fluid shaker screen system of claim 21, wherein the screen is mounted to the funnel at an angle that slopes downward from a perimeter of the screen toward the cuttings inlet.

26. The drilling fluid shaker screen system of claim 21, further comprising a vibration assembly mounted to the housing and comprising one or more springs configured to oscillate the screen assembly based at least in part on operation of the motor assembly.

27. The drilling fluid shaker screen system of claim 21, wherein the first screen mesh size is configured to allow a first cutting to pass there through, and the second screen mesh size is configured to allow a second cutting larger than the first cutting to pass there through.

28. The drilling fluid shaker screen system of claim 21, wherein the cuttings inlet comprises a hole in the screen centered at a center of the screen assembly.

29. The drilling fluid shaker screen system of claim 21, wherein the housing defines an interior volume fluidly coupled to the liquid outlet.

* * * * *